United States Patent

Van Hal et al.

[11] Patent Number: 5,905,336
[45] Date of Patent: May 18, 1999

[54] METHOD OF MANUFACTURING A GLASS SUBSTRATE COATED WITH A METAL OXIDE

[75] Inventors: Henricus A. M. Van Hal; Thomas N. M. Bernards; Claudia Mutter; Marcus J. Van Bommel, all of Eindhoven, Netherlands

[73] Assignee: U.S. Philips Corporation, New York, N.Y.

[21] Appl. No.: 08/767,099

[22] Filed: Dec. 4, 1996

[30] Foreign Application Priority Data

Dec. 6, 1995 [EP] European Pat. Off. .............. 95203364

[51] Int. Cl.$^6$ ........................................................... H01J 9/14
[52] U.S. Cl. .............................. 313/497; 445/24; 427/226
[58] Field of Search ........................ 445/24, 51; 313/495, 313/497; 427/226

[56] References Cited

U.S. PATENT DOCUMENTS

| | | | |
|---|---|---|---|
| 4,289,816 | 9/1981 | Fogelberg et al. | 428/35 |
| 5,442,253 | 8/1995 | Van Gorkom et al. | 313/497 |
| 5,726,076 | 3/1998 | Tasker et al. | 438/20 |

Primary Examiner—Kenneth J. Ramsey
Attorney, Agent, or Firm—F. Brice Faller

[57] ABSTRACT

Metal-oxide layers having a high $\delta_{max}$, such as in particular magnesium-oxide layers, are provided on a glass substrate, such as a selection plate or a channel plate, of an electronic display device by means of a spray-pyrolysis process. To this end, a solution of a metal salt, such as Mg acetate, in ethanol or another (organic) solvent and/or water is sprayed onto a substrate which is maintained at a temperature of 350–550° C. In a display device which is provided with such a layer on the bottoms and walls of the channels of the channel plate, a minimum transport voltage of 50–100V/cm is required.

10 Claims, 4 Drawing Sheets

METHOD OF MANUFACTURING A GLASS SUBSTRATE COATED WITH A METAL OXIDE

BACKGROUND OF THE INVENTION

The invention relates to a method of manufacturing a glass substrate coated with a metal-oxide layer, which is used, in particular, in flat electronic display devices.

Metal-oxide layers, in particular magnesium-oxide layers, are used, inter alia, as a secondary electron emitting layer in electron multipliers. Such a layer should have a secondary electron-emission coefficient $\delta_{max}$ of at least 1. Dependent upon the manufacturing process, magnesium oxide has a $\delta_{max}$ value in the range between 3 and 25. Magnesium-oxide layers are also used on glass selection plates and the channel plate of a flat electron display as described in U.S. Pat. No. 5,497,046, which corresponds to EP-A-0,464,937 (the so-called Zeus display). The magnesium-oxide layer is necessary to generate secondary electrons and to protect the glass plates against electron bombardment. Magnesium oxide is also used as an electrode-protection material in plasma displays (PDPs) and plasma addressed LCDs (PALCs).

Magnesium-oxide layers can be manufactured, inter alia, by RF sputtering, e-beam evaporation and Chemical Vapor Deposition (CVD). Vapor-deposited magnesium-oxide layers have a 67 value of 7–12. However, these methods are expensive and not very suitable for large-scale production of glass plates having large dimensions, such as for flat electron displays. In another known method, use is made of a paste comprising MgO particles and an organic binder. The layer is obtained by means of screen printing and calcining in air at approximately 500° C. The layer obtained, however, has a relatively low secondary electron-emission coefficient ($\delta_{max}<5$) and is porous.

A wet-chemical method of applying magnesium-oxide layers is based on the thermal decomposition of magnesium acetylacetonate in an oxygen-containing atmosphere. However, it has been found that a magnesium-oxide layer thus manufactured adheres insufficiently to glass.

Another wet-chemical method of applying (magnesium) oxide layers is the sol-gel method, as described in U.S. Pat. No. 5,412,279 and U.S. Pat. No. 5,470,606 which correspond to EP-A-0,533,256 (PHN 13.841), in the name of the current Applicant. The sol-gel method is based on the conversion of a metal-alkoxy compound in an aqueous solvent by hydrolysis and polycondensation. In this manner, for example, a silicon-dioxide layer is manufactured, using an aqueous solution of tetraethyl orthosilicate (tetraethoxy silane) as the starting material.

A drawback of magnesium-dialkoxide compounds, such as magnesium diethoxide, is, however, that the hydrolysis reaction leads to the precipitation of $Mg(OH)_2$. In addition, magnesium-dialkoxide compounds dissolve poorly in water and alcohols.

In another wet-chemical method of preparing MgO layers, magnesium ethoxide is used as the starting material. A modification with acetate and acetylacetonate groups would enable a stable coating solution to be prepared, which solution could be used to deposit MgO layers by means of a dip-coating process. By means of a subsequent curing process with UV light, it would be possible to obtain the final MgO layer.

Apart from the UV curing step, the above-described system has several other drawbacks. For example, to apply MgO layers by means of dip coating, the solutions must be stable for a long period of time. It has been found that the solutions used do not meet this requirement.

OBJECTS AND SUMMARY OF THE INVENTION

It is an object of the invention to provide a simple method of manufacturing a glass substrate coated with a metal-oxide layer, which method should be practicable, in particular, at relatively low temperatures (particularly below 500° C.), while the coating should adhere well to glass and also exhibit a sufficiently high secondary electron emission ($\delta_{max} \geqq 5$, in particular $\geqq 7$).

These objects are achieved by the following steps:

heating a glass substrate;

spraying a solution of a decomposable metal salt over a surface of said heated substrate to bring about pyrolysis of the metal salt on, or adjacent, the surface of the substrate.

The spray-pyrolysis technique of metal oxides, such as in particular MgO, consists in spraying a solution comprising a dissolved metal salt onto a hot substrate. The temperature of the substrate should be chosen to be such that the magnesium compound used decomposes, which typically takes place in the temperature range from 350° to 550° C. For the solvent use can be made of a rapidly evaporating organic solvent, although water can also suitably be used in this method. As a result of the hot substrate, the solvent will evaporate and, possibly, be burned partly. The metal salt itself generally comprises sufficient O to react into metal oxide by means of decomposition, if necessary atmospheric $O_2$ is used in this process.

A great advantage of this technique resides in that the layer is built up from the hot substrate outwards. By contrast, in a dip-coating process first a wet layer is deposited in its entirety and then dried. In a calcining process at an elevated temperature (400–500° C.), the salt is converted into oxide, which generally does not lead to very compact layers. A recognition on which the invention is based is that more compact layers can be deposited by means of spray pyrolysis. A stable liquid is not essential for a spray-pyrolysis process. To spray a liquid onto a substrate, a residence time of several hours to one day is sufficient. As regards the spray pyrolysis of MgO, typical deposition rates in the range from 2 to 100 nm per minute have been achieved. A deposition rate of 2 nm/min. led to a $\delta_{max}>9$, while a deposition rate of 100 nm/min. resulted in a $\delta_{max}$ of approximately 7. If necessary, even metal-salt particles can be sprayed onto a substrate and subjected to pyrolysis.

If the coated surfaces of the glass substrates are to be used in specific types of electronic display devices, they must comprise a number of recessed portions having walls and bottoms (for example in the form of a number of parallel channels). For a proper operation of the display device (for example to guarantee electron transport), it is important that the coatings on the walls are sufficiently thick, particularly a thickness of at least 5 nm, preferably>10 nm. The spray-pyrolysis method in accordance with the invention makes it possible to meet said requirement, without the formation of a much thicker layer on the bottoms. Particularly evaporation-coating processes can give rise to large differences in layer thickness on the walls and bottoms, so that it is possible that the walls have areas with insufficient material.

As the solvent for the metal-salt solution, for example, (100%) alcohol, (100%) ketone, (100%) water, or a mixture of at least two of said substances can be used. Suitable alcohols are, for example, methanol, ethanol and isopropanol. An example of a suitable ketone is acetone. Using 100% water as the solvent, a $\delta_{max}$ of 9 to 10 was achieved.

If necessary, magnesium-oxide particles are added to the coating solution in accordance with the invention. These magnesium oxide particles can be prepared beforehand in such a manner that they acquire a maximum secondary electron-emission coefficient $\delta_{max}$. These particles can be prepared, for example, by heating $Mg(OH)_2$ to 800° C. The size of the particles ranges, for example, from 1 to 50 or 100 nm. After the particles have been prepared, they are suspended in the coating solution in accordance with the invention. The concentration of the particles is, for example, 1–10 wt. %.

The liquid is sprayed onto a glass substrate in the manner described hereinabove. The magnesium-oxide layer formed comprises a matrix of magnesium-oxide particles at the glass surface. This is important, in particular, for thicker layers (thickness >1 μm), as required, for example, in the case of plasma displays.

These and other aspects of the invention will be apparent from and elucidated with reference to the embodiments described hereinafter.

DESCRIPTION OF THE PREFERRED EMBODIMENTS

Exemplary embodiment 1

Figure 1:
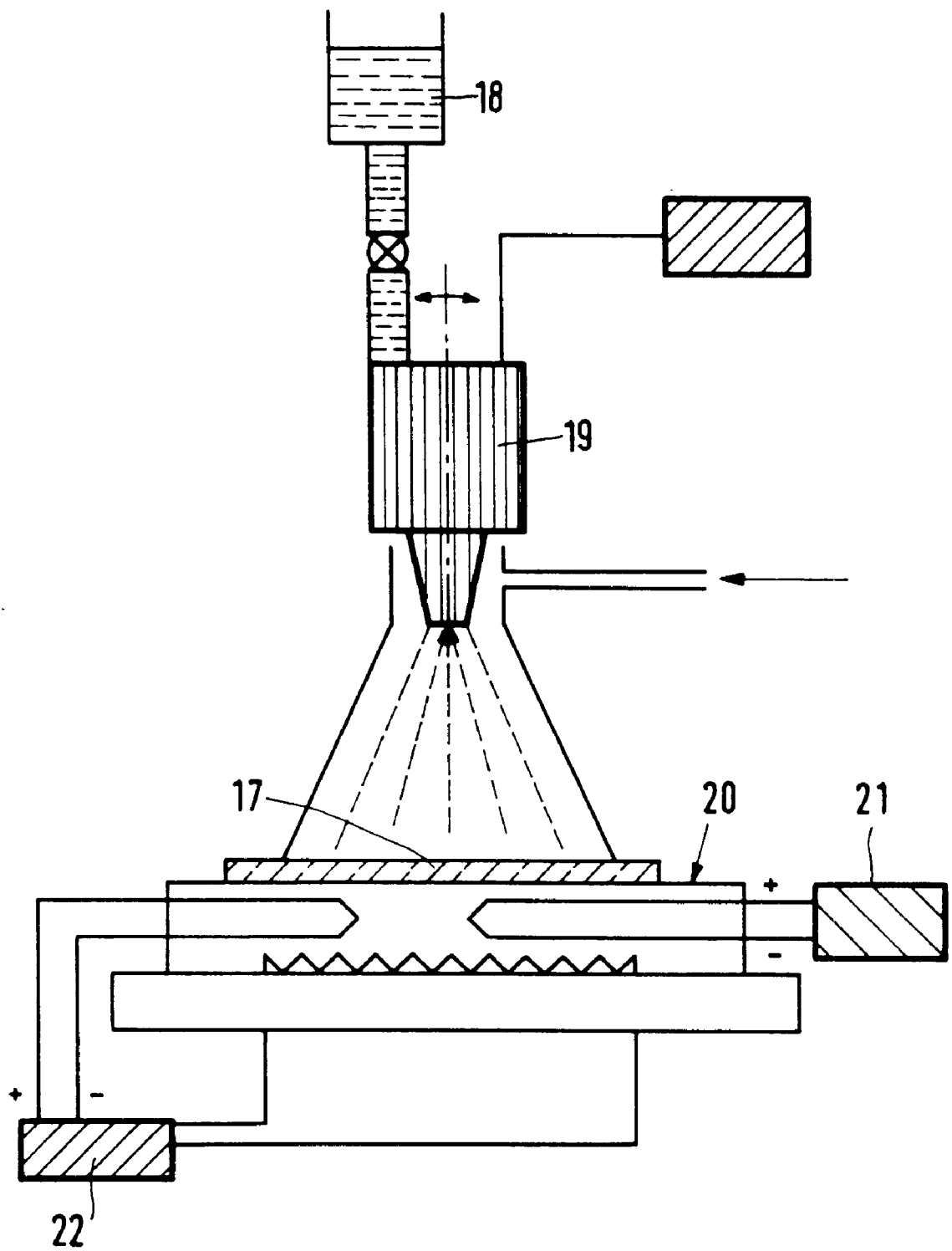
FIG. 1 schematically shows a device for carrying out a spray-pyrolysis process.

To deposit MgO layers onto a glass substrate use can be made of the spray-pyrolysis reactor shown in FIG. 1.

The substrates 17, which are used in displays, consist, for example, of rectangular glass plates having a dimension along the diagonal of 10 inches and more.

A solution 18 containing an Mg salt is, for example, nebulized and sprayed by means of an ultrasonic nozzle 19. In an interesting alternative, the solution is sprayed directly by means of a pneumatic sprayer, for example a paint sprayer. In this case, a liquid is forced through a nozzle under pressure. Apart from being e.g. a nitrate, carbonate or chloride, the Mg salt can advantageously be selected from the group of volatile organometallic compounds. Useful representatives of this group are, β-diketonates, alkoxides, carboxylates.

The substrates 17 are maintained at a desired temperature by means of a heating device 20 (hot plate), which in this case is horizontally arranged, and which comprises a temperature sensor 21 and a temperature controller 22. On the one hand, this temperature is below the compacting temperature of the glass used and, on the other hand, it is high enough to cause the Mg salt used to decompose as soon as it comes into contact with the heated substrate. For example, Mg acetate decomposes at approximately 350° C., Mg nitrate at approximately 500° C. and Mg acetylacetonate at 500° C. or higher. The hot plate 20 reciprocates during the spraying process. The nozzle is arranged at a distance of several decimeters from the hot plate 20 and can make an acute angle (for example 45°) with the hot plate during the spraying process. During spraying, the nozzle moves in a direction which is perpendicular to that of the hot plate, the movement of the nozzle being 5–10× as fast as the movement of the hot plate to obtain a uniform coating.

Exemplary embodiment 2

For the spraying experiments use is made of a coating solution comprising 10 g $Mg(O_2C_2H_3)_2 4H_2O$ dissolved in 100 g ethanol. The spraying process is carried out on glass substrates which are arranged vertically, or under an angle between 0° and 45° with the vertical direction, on a hot plate and which reciprocate during the spraying operation. The nozzle is moved in a direction perpendicular to this movement. During a spray cycle of 5 seconds, the temperature decreases from 450° C. to 400° C. The spraying process is repeated 20 to 30 times. After each cycle, the process is interrupted until the temperature has reached 450° C. again. The secondary emission coefficient of the MgO layers obtained is determined. The results are listed in Table I Table I $\delta_m$ results of MgO layers provided by means of spray pyrolysis.

| No. | $\delta_m$ |
|---|---|
| 1 | 11.6 |
| 2 | 10.5 |
| 3 | 9.8 |

The above-described method has also been used to deposit MgO layers on the channel plate of a thin electronic display comprising electron-propagation channels which are parallel to the phosphor screen, as described in U.S. Pat. No. 5,552,253. The 50 nm thick MgO layer provided by means of spray pyrolysis (layers having thicknesses of 10–100 nm prove to be very suitable for this application) in a specific display yielded a system in which a voltage along the length of the channel of 63V/cm was already sufficient for electron transport. Minimum transport voltages as low as 50V/cm were even realized in certain cases.

An additional advantage of the spray-pyrolysis technique used resides in that, since the substrate must be at an elevated temperature to carry out the deposition process, organic impurities absorbed at the surface are burned, so that a cleaning process, which would otherwise be necessary to guarantee a good adhesion, can be precluded.

Figure 2A:
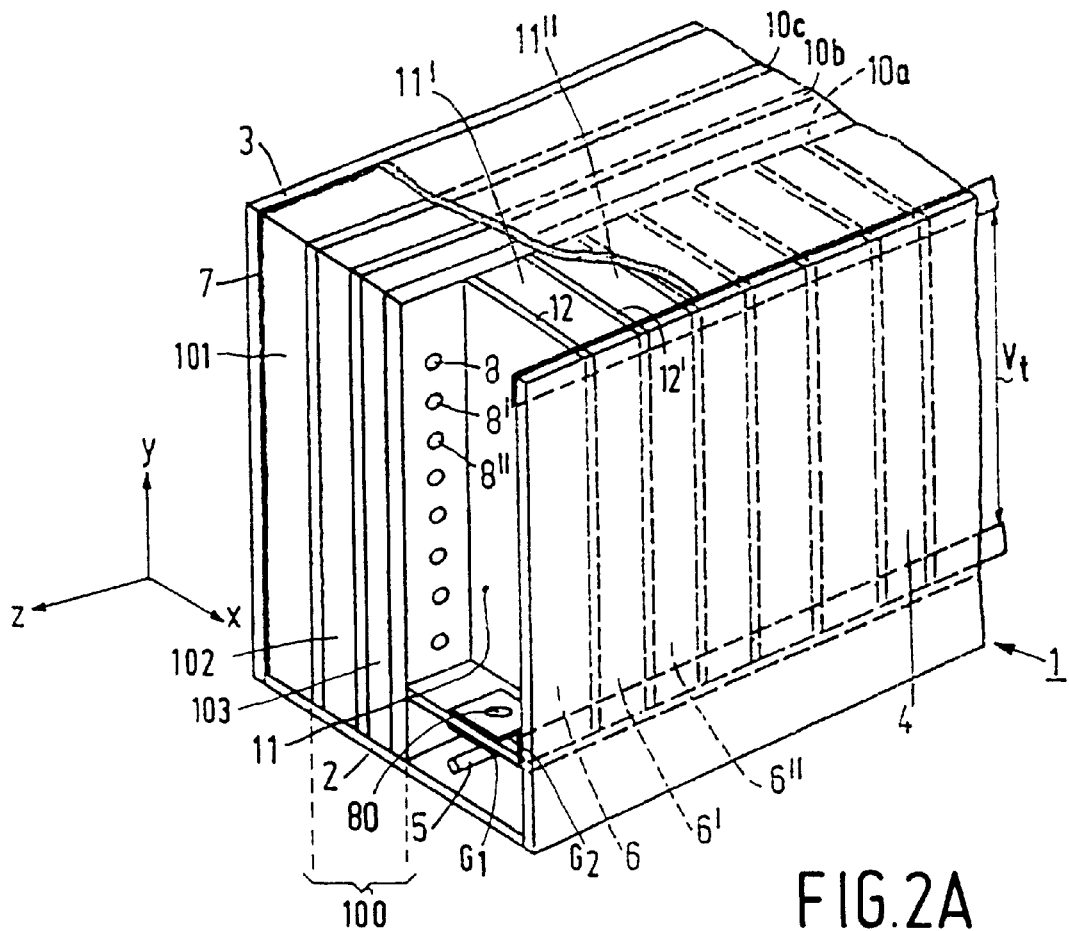
FIGS. 2A, 2B show, respectively, a schematic, elevational view and a sectional view of a flat electronic display device comprising a channel plate and a selection plate system.
Figure 2B:
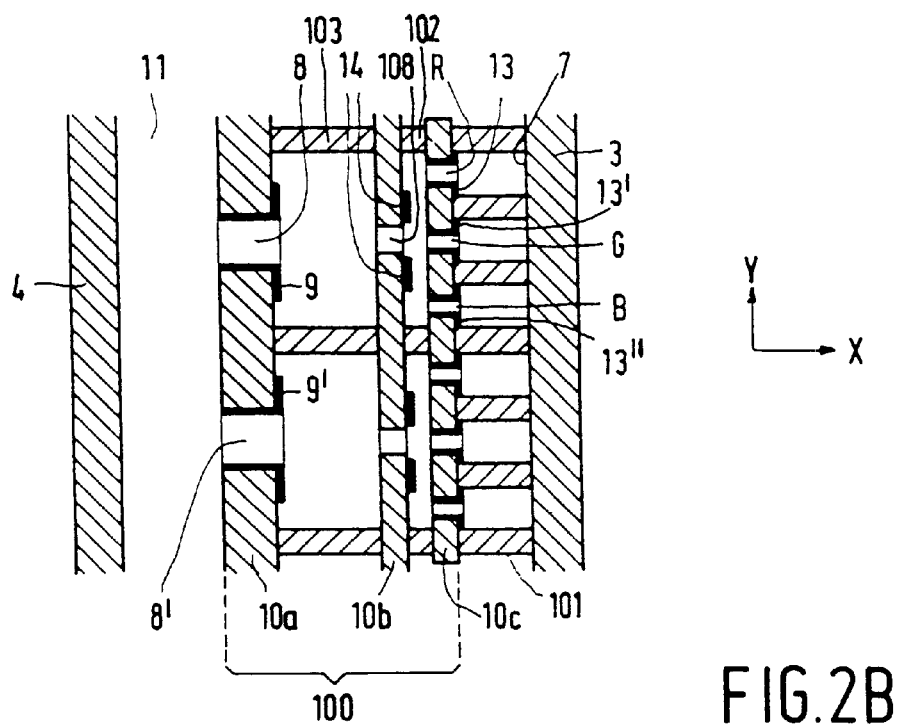

Glass plates provided with an MgO coating are used, inter alia, in flat-panel display devices of the type shown in FIGS. 2A, 2B.

FIG. 2A shows a flat-panel display device comprising a display panel (window) 3 and an oppositely located rear wall 4. On the inner surface of the window 3 there is provided a luminescent screen 7 comprising a repetitive pattern (lines or dots) of triads of phosphor elements luminescing in red (R), green (G) and blue (B), respectively. In accordance with a practical embodiment, the (dot-shaped) phosphor elements of a triad are situated at the vertices of a triangle, however, other configurations are also possible.

An electron-source arrangement 5, for example a line cathode which, by means of electrodes, provides a large number of electron emitters, for example 600, or a corresponding number of separate emitters, is arranged proximate to a wall 2 which interconnects panel 3 and rear wall 4. Each of these emitters is to provide a relatively small current, so that many types of cathodes (cold or hot cathodes) are suitable as emitters. The emitters may be driven by a video drive circuit. The electron-source arrangement 5 is arranged opposite entrance apertures of a row of electron-propagation channels extending substantially parallel to the screen, which channels are constituted by compartments 6, 6', 6", ... etc.; in this case one compartment for each electron source. These compartments have cavities 11, 11', 11", ... defined by the rear wall 4 and partitions 12, 12'... The cavities 11, 11', ... may alternatively be provided in the rear wall 4 itself. At least one wall (preferably the rear wall) of each compartment should have a high electrical resistance, at least in the direction of propagation, which is suitable for the purpose of the invention (suitable materials are, for example, ceramic material, glass, coated or uncoated synthetic resin), and have a secondary emission coefficient $\delta_{max} > 1$ over a given range of primary electron energies. An axial propagation field is generated in the compartments by applying a potential $V_t$ across the height of the compartments 6, 6', 6"...

The electrical resistance of the wall material has such a value that a minimum total count of current (preferably less than, for example, 10 mA) will flow in the walls at a field strength in the axial direction in the compartments which is sufficient for electron propagation. By applying a voltage of the order of several tens to several hundred volts (value of the voltage is dependent on the circumstances) between the row 5 of electron sources and the compartments 6, 6', 6", electrons are accelerated from the electron sources towards the compartments, whereafter they impinge upon the walls in the compartments and generate secondary electrons.

The space between the compartments and the luminescent screen 7, which screen is arranged on the inner wall of panel 3, accommodates an active color selection system 100 which, in this case, comprises an (active) preselection plate 10a, a (passive) obstruction plate 10b and an (active) (fine-) selection plate 10c (see also FIG. 2B). Structure 100 is separated from the luminescent screen 7 by a so-called flu spacer structure 101, for example an apertured plate of an electrically insulating material. FIG. 2B shows in a schematic cross-section a part of the display device of FIG. 2A in greater detail, particularly the active color selection system 100 comprising preselection plate 10a with apertures 8, 8', 8", ... , and fine-selection plate 10b with groups of apertures R, G, B. For example, one time or two times three fine-selection apertures R, G, B are associated with each preselection aperture 8, 8', etc. Other numbers are also possible. (In the schematic FIG. 2, the apertures R, G, B are coplanar). However, in reality they will generally be arranged in a configuration corresponding to a triangle, see, for example, FIG. 3). An apertured obstruction plate 10b, which comprises holes 108 and which forms "chicanes", is arranged between preselection plate 10a and fine-selection plate 10c.

Electron propagation ducts 6 with transport cavities 11, 11', ... are formed between the selection system 100 and rear wall 4. In order to be able to extract electrons from the propagation ducts 6 via the apertures 8, 8', ..., addressable, metal preselection electrodes 9, 9', etc. are arranged near the apertures 8, 8', ... , on the plate 10a.

Similarly as the plate 10a, the fine-selection plate 10c is provided with addressable rows of (fine-)selection electrodes for realizing fine selection. The possibility of capacitively interconnecting (for example via coupling capacitors) corresponding rows of fine-selection electrodes is important in this respect. In fact, a preselection has already taken place and, in principle, electrons cannot land at the wrong location. This means that only one group, or a small number of groups, of three separately formed fine-selection electrodes is required for this form of fine selection.

To ensure that no electrons, or a negligibly small number land at a wrong location, which would adversely affect the contrast and the color purity, the apertured auxiliary or obstruction plate 10b of an electrically insulating material is arranged between the preselection plate 10a and the (fine-) selection plate 10c. Each aperture 108 in the obstruction plate 10b corresponds to an aperture in the preselection plate 10a (FIG. 2).

It should be noted that several variants of the construction comprising the obstruction plate 10b as shown in FIG. 2B are possible. For example, the plate 10b may be combined with one or both spacer plates 102, 103 on both sides to form one unit.

It is important for a satisfactory operation of the display device, that the bottoms and walls of the propagation channel 11 are provided with a coating of a material having a secondary emission coefficient $\delta_{max}$ which is sufficiently high to ensure electron propagation, said material preferably also having a good resistance to electron bombardment. MgO is such a material, and hereinabove it has been described that spray pyrolysis is a novel, very advantageous method of providing a coating of this material on the bottoms and walls of the (glass) channels. Also see FIG. 3, in which a number of characteristic dimensions of the deep, narrow channels are shown by way of example. Particularly because they enable a high value of $\delta_{max}$ ($\delta_{max} \geq 5$, in particular $\geq 7$) in combination with a uniform thickness and a good adhesion to be obtained. It has been found that the display device can be operated by means of propagation voltages in the axial channel direction between 50 and 80V/cm.

Figure 3:
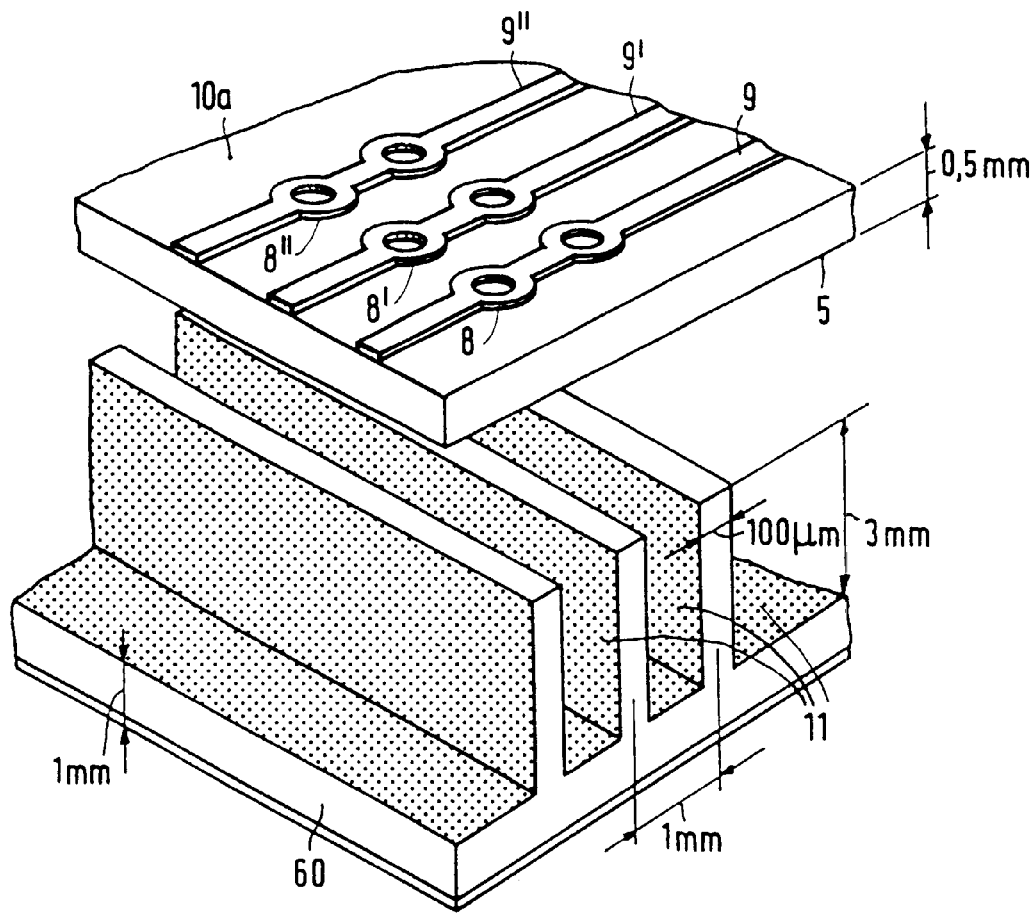
FIG. 3 is an elevational view of a part of the channel plate with the selection plate of the display device of FIG. 2.

It is also important for a satisfactory operation of the display device that a coating similar to the one described hereinabove is present on the electron-entrance surface of at least one of the (glass) plates of the selection system arranged between the propagation channels and the phosphor screen. FIG. 3 shows the preselection plate 10a which is provided with apertures 8, 8', 8". . . , and whose surface facing the channels 11 is preferably provided with said coating.

Figure 4:
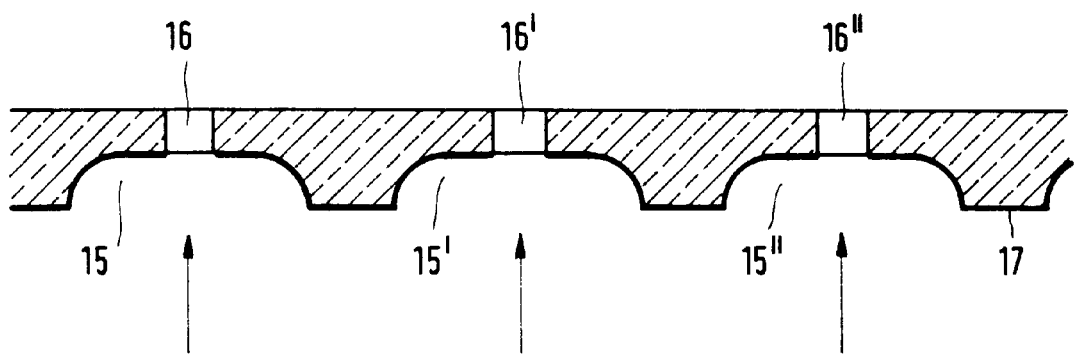
FIG. 4 is a cross-sectional view of a plate of the selection-plate system of the display device of FIG. 2.

FIG. 4 shows a cross-section of a plate of the selection system. This plate, for example, combines the functions of the plates 102 and 120b. Such a (selection) plate is provided, on the side where the electrons enter, with recessed portions 15, 15', 15". . . (the "entrance holes") in which perforations which allow passage of electrons 16, 16', 16" end. The surface 17 on the side where the electrons enter and the walls and the bottoms of the recessed portions 15, 15', 15" . . . are provided with the above-mentioned coating.

In summary, the invention relates to the provision of metal-oxide layers, in particular of the type having a high $\delta_{max}$, such as magnesium-oxide layers, on a glass substrate, such as a selection plate or a channel plate of an electronic display, by means of a spray-pyrolysis process. To this end, a solution of a metal salt, such as Mg acetate, in ethanol or another (organic) solvent and/or water is sprayed onto a substrate which is maintained at a temperature of 350–550° C. In a Zeus display device having such a layer on the bottoms and walls of the channels of the channel plate, a minimum transport voltage as low as 50V/cm appeared to be sufficient.

Figure 5:
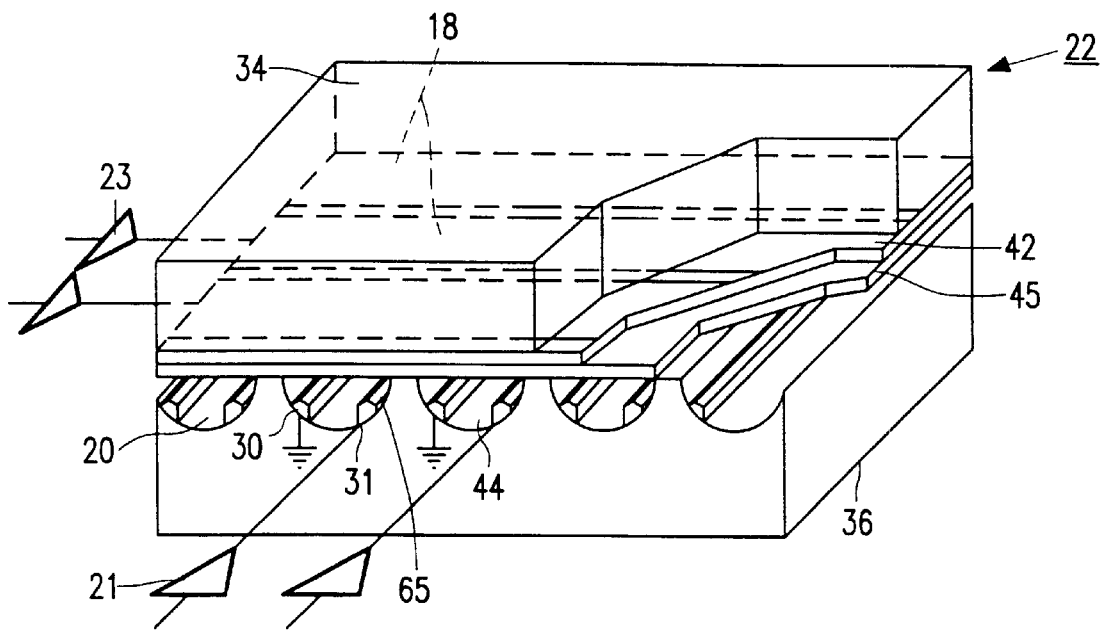
FIG. 5 shows a PALC type display panel.

FIG. 5 illustrates a PALC type display panel using LC material. Only 3 of the column electrodes 18 are shown. The row electrodes 20 are constituted by a plurality of parallel elongated sealed channels underlying (in FIG. 2) a layer 42 of the LC material. Each of the channels 20 is filled with an ionizable gas 44, closed off with a thin dielectric sheet 45 typically of glass, and contains on an interior channel surface first and second spaced elongated electrodes 30, 31 which extend the full length of each channel. The first electrode 30 is grounded and is commonly called the cathode. The second electrode 31 is called the anode, because to it will be supplied relative to the cathode electrode a positive strobe pulse sufficient to cause electrons to be emitted from the cathode 30 to ionize the gas. As explained above, each channel 20, in turn, has its gas ionized with a strobe pulse to form a plasma and a grounded line connection to a row of pixels in the LC layer 42 above. When the strobe pulse terminates, and after deionization has occurred, the next channel is strobed and turned on. Since the column electrodes 18 each cross a whole column of pixels, only one plasma row connection at a time is allowed on to avoid cross-talk.

At least one of the row electrodes 30 and 31 is covered by a thin (e.g., 1.0 mil) layer 65 of dielectric material such as glass. (Layer 65 covers only electrode 31 in the figures.) Optional layers 65a of highly emissive secondary electron-emitting material such as magnesium oxide cover layer 65 on electrode 31 and electrode 30 to enhance the ionization of the gas contained within channels 20. As an alternative, the entire surface of each channel 20 may be coated with a continuous thin layer of dielectric material, thereby covering both row electrodes 30 and 31.

PDPs are available with either alternating current (ac) or direct current (dc) driving circuitry. In dc PDPs, the electrodes are in contact with the gas mixture while in ac devices the electrodes are covered with a dielectric layer. We focus below on ac PDPs.

The dielectric layers are coated with a magnesium oxide (MgO) layer. The role of the MgO film is to protect the dielectric layers and to decrease the discharge voltage owing to the large secondary electron emission coefficient of MgO under bombardment by neon ions. In some PDPs, the cell geometry includes dielectric barrier ribs parallel to the electrodes on one plate in order to physically separate adjacent cells and to avoid cross-talk.

Figure 6:
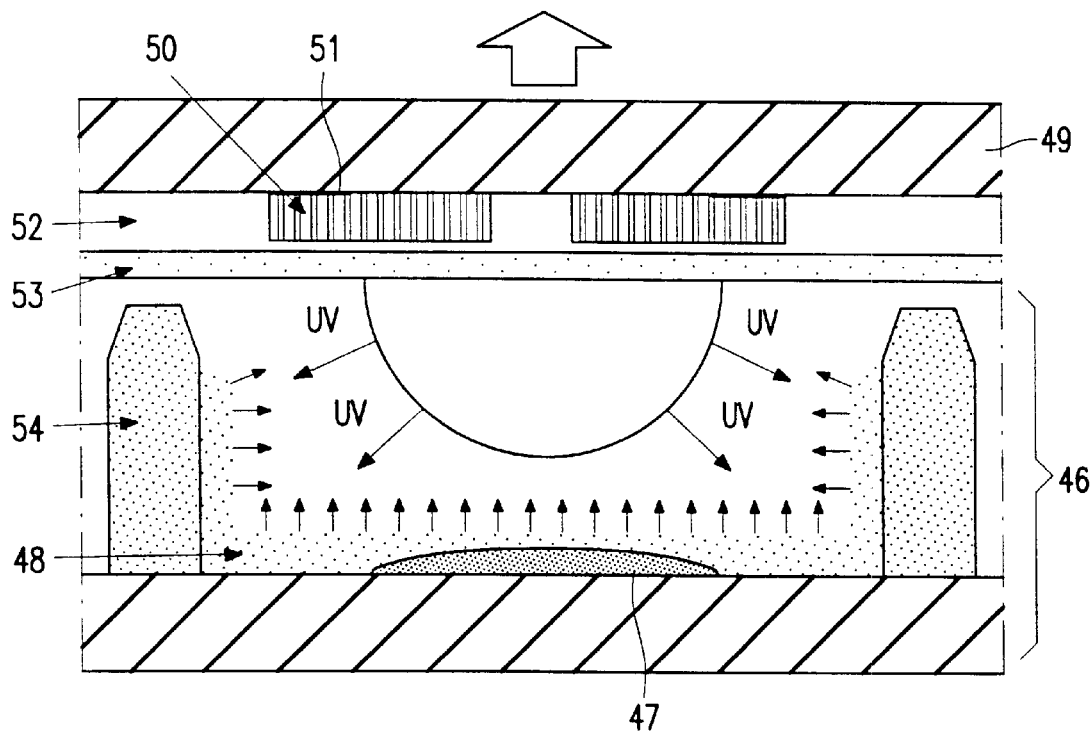
FIG. 6 is a schematic cross-section of the internal structure of a PDP panel.

A schematic cross-section of the internal structure of a PDP panel is given in FIG. 6. The rear plate 46 consists of a number of parallel channels with a metal track 47 on the bottom of the channels. The channels including the electrodes are each covered with phosphor 48 of one colour in a sequence of R,G,B. On the front plate 49 transparent electrodes 50 are formed with a small metal electrode 51 to lower the resistance of the tracks. The electrodes 50 are covered by a layer 52 of dielectric material. An optional layer 53 of highly emissive secondary electron-emitting material such as MgO covers the dielectric layer 52. A cell is formed at the crossing of one channel (the column) and two transparent electrodes. One transparent electrode of each cell is internally connected to one of the electrodes of all the other cells. Therefore, for driving the panel the number of connections is "the number of rows +the number of columns +1".

The cross-section shows two barrier ribs 54 which are deposited by a multi-step screen printing process have a height of about 130 $\mu$m. An equal height of the barrier ribs is obtained by grinding. The distance between adjacent ribs is 220 $\mu$m. In between the ribs addressing electrode 47, mainly consisting of silver, is present. The surface of the addressing electrode and of the walls of the barrier ribs is covered with loosely packed phosphor particles.

We claim:

1. A method of manufacturing a glass substrate coated with a metal-oxide layer, which method comprises the following steps:

providing a glass substrate having a surface provided with a plurality of parallel channels, heating said glass substrate;

spraying a solution of a decomposable metal salt onto said surface of said heated substrate to bring about pyrolysis of the metal salt on, or adjacent, the surface of the substrate.

2. A method as claimed in claim 1, characterized in that the solution also comprises oxide particles of the metal.

3. A method as claimed in claim 1, in which the channels comprise recessed portions having walls and bottoms, and in which the solution is sprayed onto the surface and onto the bottoms and walls of said recessed portions.

4. A method as claimed in claim 1, in which a metal salt is used which decomposes at temperatures in the range between 350 and 550° C.

5. A method as claimed in claim 1, in which the metal salt is selected from the group of volatile organo-metallic compounds.

6. A method as claimed in claim 1, in which the metal salt is dissolved in an organic solvent and/or water.

7. A glass substrate for an electronic display, said substrate having a surface provided with a plurality of parallel channels, said surface being provided with a metal-oxide coating which is applied by spray pyrolysis.

8. A glass substrate as claimed in claim 7, wherein said parallel channels comprise walls and bottoms which are covered with said metal oxide coating.

9. A glass substrate as claimed in claim 7, wherein said channels comprise a plurality of recessed portions in which perforations end, said recessed portions having walls and bottoms which are covered with said metal-oxide coating.

10. An electronic display comprising a glass substrate, as claimed in claim 7, and means for applying a propagation voltage in the range between 50 and 80V/cm in the axial direction of the channels.

* * * * *